and a smaller diameter horizontal bore extending into the forward streamlined dimensions of the housing, journal bearings respectively mounted directly in the smaller horizontal and vertical bores of said chambers, combined radial-thrust bearings mounted in the larger horizontal and vertical bores, means closing each of said chambers and retaining the bearing in each of the larger diameter bores in fixed relation to the annular shoulder of the respective bore, a drive shaft rotatably supported by the bearings in said vertical bores and projecting into said horizontal bore, a propeller shaft rotatably supported by the bearings in said horizontal bores, a drive gear secured to the lower end of said vertical shaft, and a driven gear carried by said horizontal shaft in mesh with said drive gear, said bearings being substantially spaced whereby the respective shafts are broadly supported against misalignment, said shafts and respective gears being subject to axial adjustment in said journal bearings and axially secured against thrust loads by said combined radial-thrust bearings, and said housing being of a unitary cast metal construction whereby the predetermined alignment of said bores is permanently established and the alignment of said shafts is independent of said closing and retaining means.

7. An outboard motor underwater assembly, comprising a single-piece housing member having a gear chamber therein including a substantially cylindrical bore open at its outer end and having an outwardly facing shoulder therein at its inner end, a shaft disposed centrally of said bore with a beveled gear thereon in said chamber, said shaft projecting axially from said bore, a bearing disposed against said outwardly facing shoulder in said bore and supporting said shaft for rotation and against axial displacement, a cylindrical closure member disposed within said bore outwardly of said bearing and sealed against said shaft, an expansible ring seal confined between said bearing and member and compressed axially thereby to radially expand the same into sealing engagement with the walls of said bore, the compression of said ring seal being limited by positive engagement between said member and bearing, and means to force said member against said bearing and secure the assembly within said housing with said ring seal radially expanded and preventing leakage of water into said housing chamber, said bore being smooth in the region of said ring seal to provide for adjustment of the location of said bearing and seal by shimming between said bearing and shoulder to adjust said gear.

ELMER C. KIEKHAEFER.

REFERENCES CITED

The following references are of record in the file of this patent:

UNITED STATES PATENTS

| Number | Name | Date |
|---|---|---|
| 1,302,958 | Pack | May 6, 1919 |
| 1,347,575 | Bungay | July 27, 1920 |
| 1,579,834 | Pierce | Apr. 6, 1926 |
| 1,594,534 | Leister | Aug. 3, 1926 |
| 1,711,963 | Perry | May 7, 1929 |
| 1,762,957 | Buehner | June 10, 1930 |
| 1,808,469 | Lothrop | June 2, 1931 |
| 1,893,661 | Smith | Jan. 10, 1933 |
| 1,893,662 | Smith | Jan. 10, 1933 |
| 1,932,523 | Irgens | Oct. 31, 1933 |
| 1,947,004 | Goddard | Feb. 13, 1934 |
| 1,983,558 | Morin et al. | Dec. 11, 1934 |
| 1,995,419 | Derrom | Mar. 26, 1935 |
| 2,022,290 | Large | Nov. 26, 1935 |
| 2,143,573 | Palmer | Jan. 10, 1939 |
| 2,143,968 | Alden | Jan. 17, 1939 |
| 2,204,373 | McIntosh | June 11, 1940 |
| 2,212,939 | Irgens | Aug. 27, 1940 |
| 2,348,173 | Young | May 2, 1944 |
| 2,425,441 | Riley | Aug. 12, 1947 |

April 17, 1951 E. C. KIEKHAEFER 2,549,478
INTERNAL-COMBUSTION ENGINE
Filed Sept. 5, 1947 5 Sheets-Sheet 1

INVENTOR.
ELMER C. KIEKHAEFER
BY Robert Latta
ATTORNEY

April 17, 1951  E. C. KIEKHAEFER  2,549,478
INTERNAL-COMBUSTION ENGINE
Filed Sept. 5, 1947  5 Sheets-Sheet 3

INVENTOR.
ELMER C. KIEKHAEFER
BY
ATTORNEY

April 17, 1951 E. C. KIEKHAEFER 2,549,478
INTERNAL-COMBUSTION ENGINE
Filed Sept. 5, 1947 5 Sheets-Sheet 4

INVENTOR.
ELMER C. KIEKHAEFER
BY Robert Latta
ATTORNEY

April 17, 1951  E. C. KIEKHAEFER  2,549,478
INTERNAL-COMBUSTION ENGINE
Filed Sept. 5, 1947  5 Sheets-Sheet 5

INVENTOR.
ELMER C. KIEKHAEFER
BY Albert Latta
ATTORNEY

Patented Apr. 17, 1951

2,549,478

UNITED STATES PATENT OFFICE 2,549,478

INTERNAL-COMBUSTION ENGINE

Elmer C. Kiekhaefer, Cedarburg, Wis.

Application September 5, 1947, Serial No. 772,342

12 Claims. (Cl. 123—73)

This invention relates to internal combustion engines, particularly to the manner of positioning the valves for admitting the atomized fuel mixture into the crankcase prior to its transfer into the combustion chamber. In this respect the transfer passage serves the dual function of first accommodating the fuel mixture for transmission into the crankcase and thence accommodates the fuel mixture for transmission from the crankcase to the combustion chamber.

The positioning of the fuel admission valves in the manner accomplished by the invention affords a reduction in overall volume of the crankcase, thereby resulting in higher compression of the fuel mixture within the crankcase preparatory to its transfer to the combustion chamber.

In prior art engine practice it has been known to mount the carburetor and intake manifold at the base of the crankcase and to direct the incoming fuel mixture through the wall of the crankcase and thence through the body portion of a stationary bearing ring mounted within the crankcase. The bearing ring served to partition the crankcase into separate chambers—a chamber for each cylinder. Reed type valves were mounted on opposite faces of the bearing ring for admitting the fuel mixture into the crankcase chambers. It was consequently necessary to provide space within the crankcase to permit the valve to open into the space and at the same time to provide additional space to assure clearance between the revolving crankcase and the stationary valve.

In the present invention the need for this additional space within the crankcase is eliminated and the volume of the crankcase is reduced thereby affording greater compression within the crankcase on the down stroke of the piston.

The primary object of the invention is therefore to provide an internal combustion engine having fuel admission valves positioned in a manner to afford maximum compression within the crankcase.

Another object of the invention is to position the fuel admission valves in a manner permitting dual functioning of the transfer passage.

A further object of the invention is to provide a novel means for mounting the fuel admission valves adjacent the transfer passage.

A further object is to provide novel means for supporting the fuel admission valves and for deflecting the fuel mixture into the cylinder inlet ports.

Another object is to provide means for supporting the carburetor and for directing the fuel mixture from the carburetor to the transfer passage.

Another object is to provide means for utilizing a reed type valve in multiples.

Other objects and advantages of the invention will become apparent upon reading the following specification and upon examination of the drawings in which.

Figure 1:
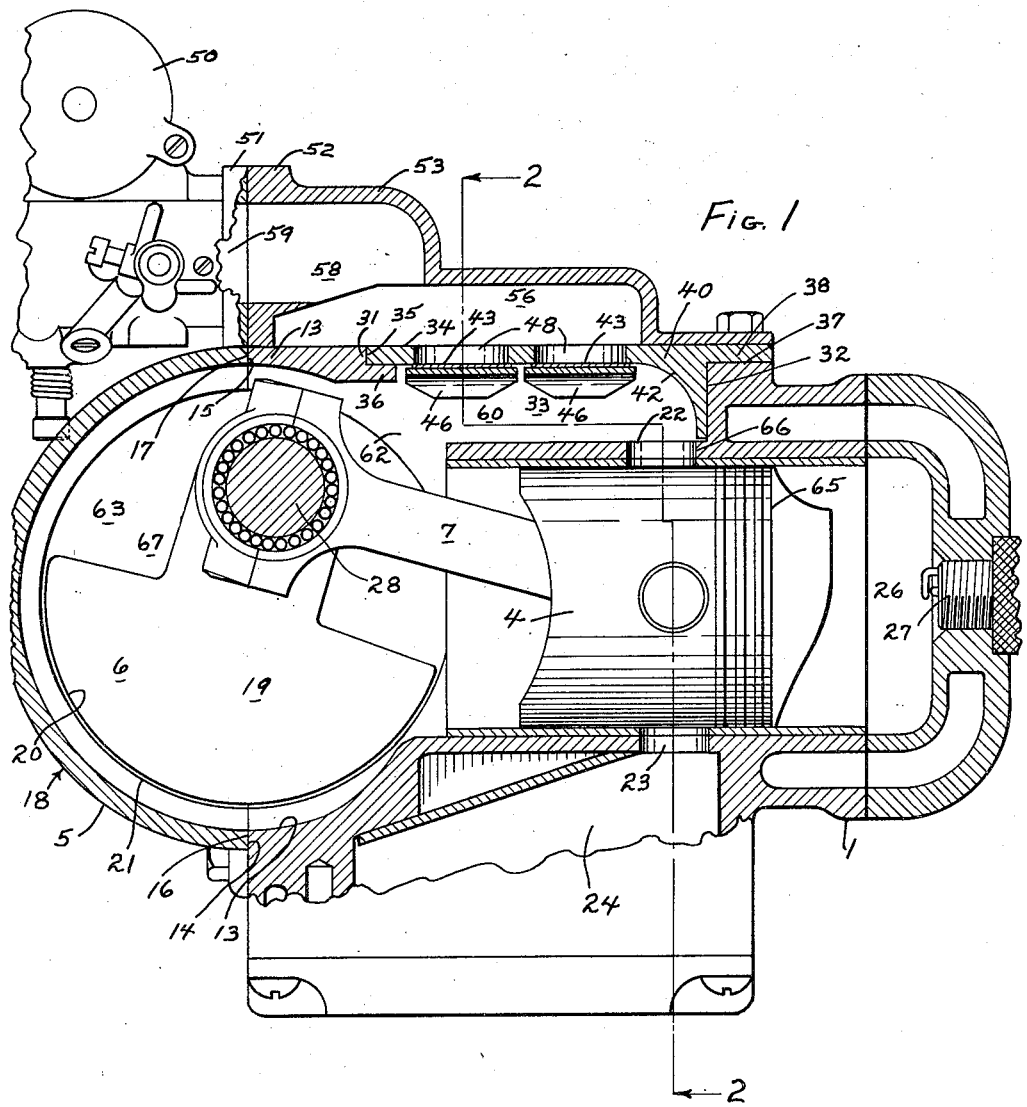
Fig. 1 is a sectional view of a two cylinder in line alternate firing two cycle engine employing the invention—the engine being shown in normal upright operating position.

In general the invention includes an internal combustion engine having an engine block 1, cylinders 2 and 3, pistons 4, crankcase cover 5, crankshaft 6 and connecting rods 7 and 8. The connecting rods may be secured to the crankshaft 6 and the wrist pins 9 and 10 with needle bearings 11 and 12.

One side of the engine block 1 has curved internal walls 13 the outer faces 14 and 15 of which register with corresponding faces 16 and 17 of crankcase cover 5 to form a substantially cylindrical shaped crankcase, hereinafter referred to generally as 18. It will be noted that the crank cheek 19 of crankshaft 6 revolves within the crankcase with a minimum of clearance between the periphery 20 of the crank cheek and the internal wall 21 of the crankcase, thereby cutting down the "dead" or "unoccupied" space within the crankcase to a minimum. Thus when piston 4 is on its down stroke, the fuel mixture in the crankcase is confined within a minimum amount of space and consequently is highly compressed when the piston nears the end of its down stroke. This condition is desirable as will be hereinafter explained.

The cylinders 2 and 3 are provided with fuel inlet ports 22 and exhaust ports 23 opposite the inlet ports. The exhaust gases are expelled through the exhaust ports 23 into the expansion chamber 24 and thence into chamber 25 and then out into the atmosphere.

On the side of the engine block opposite the expansion chamber 24, the fuel mixture is introduced into the combustion chamber 26 and fired by spark plug 27 when the connecting rod 7 and crank pin 28 are a few degrees beyond dead center—dead center being reached when the piston is at the end of its up stroke.

Figure 2:
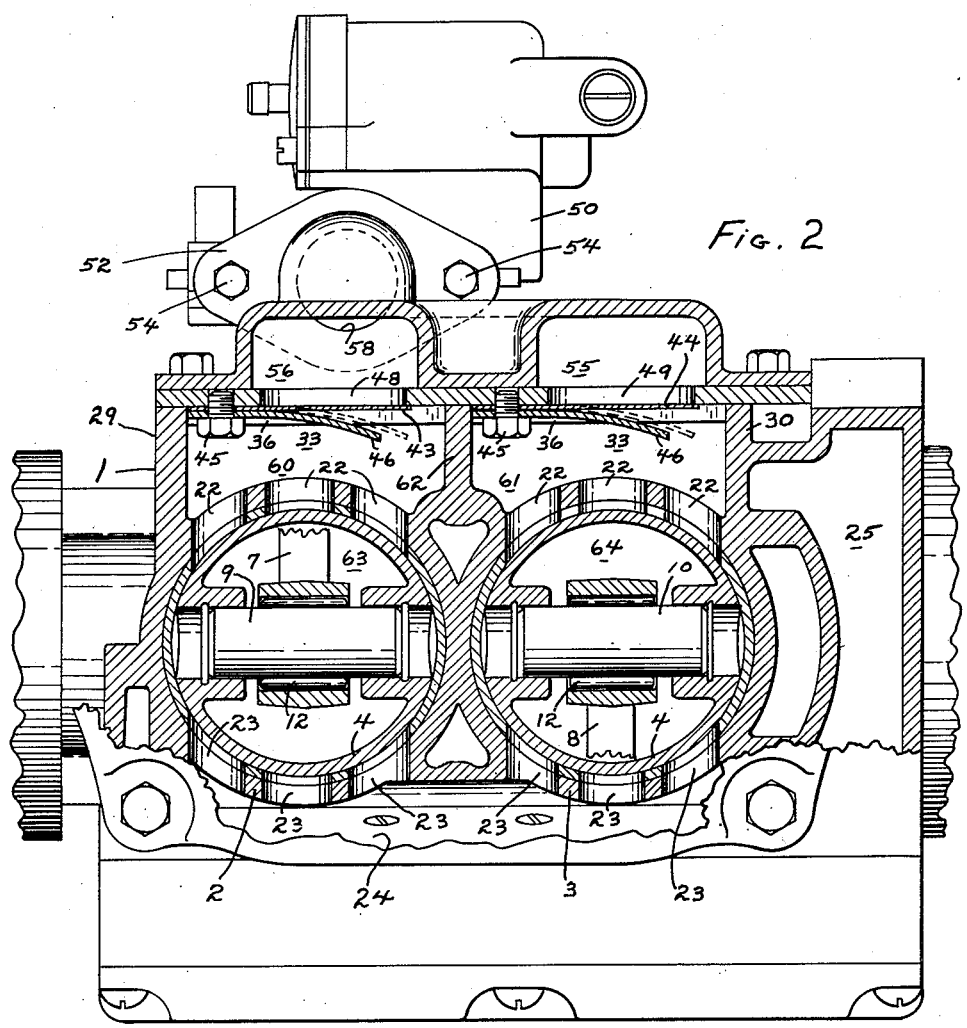
Fig. 2 is a sectional view taken on line 2—2 of Fig. 1.
Figure 3:
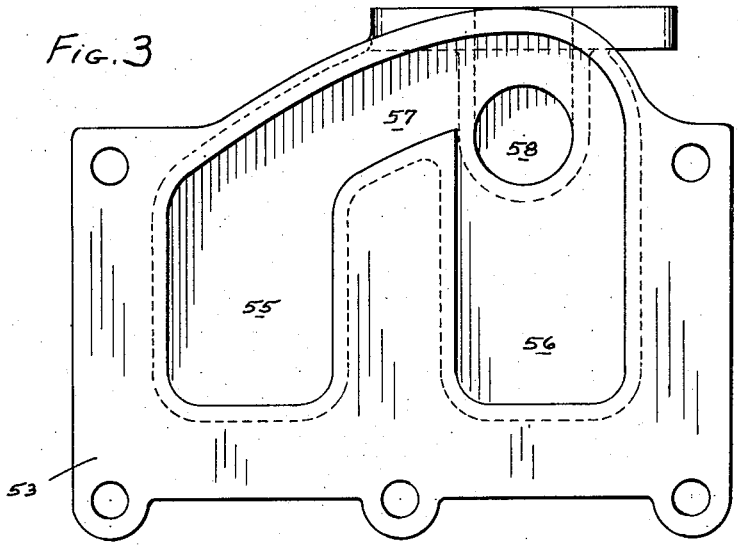
Fig. 3 is a detail view of the intake manifold.
Figure 4:
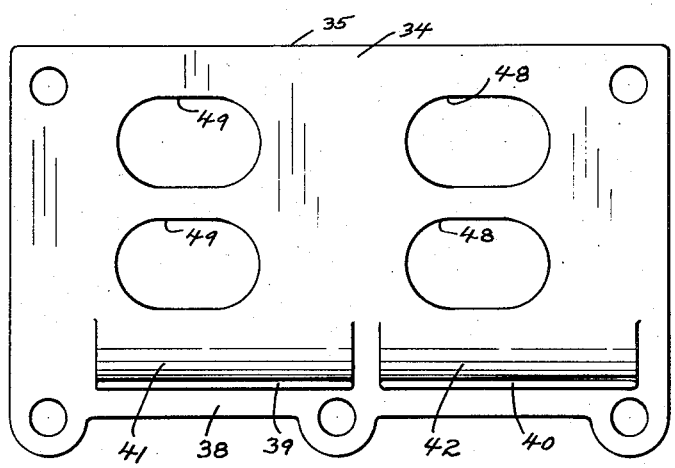
Fig. 4 is a detail view of the valve plate.

The engine block 1 has outwardly protruding walls 29 and 30, and 31 and 32 forming a substantially rectangular shaped cavity 33 which serves as a transfer passage for conducting the fuel mixture into the crankcase and into the combustion chambers 26. The cavity 33 is closed off from the exterior by a plate 34 which is received within the cavity 33 in the manner shown in Figs. 1 and 2. The wall 31 and flange 36 of engine block 1 accommodate the edge 35 of plate 34 and the wall 32 and face 37 of engine block 1 accommodate the opposite side 38 of plate 34. It will be noted that plate 34 is provided with a pair of inwardly projected deflector walls 39 and 40 with arcuate faces 41 and 42 which direct the fuel mixture toward the inlet ports 22.

The fuel admission valves 43 and 44 are preferably of the reed type and may consist of a thin strip of steel of the type used in the manufacture of leaf springs. The valves may be secured to the valve plate 34 with bolts 45 and leaf type stop members 46 limit the extent to which the valves 43 and 44 may open and also assist in maintaining the valves in their normally closed position as viewed in Fig. 2. The valve plate 34 is provided with elongated ports 48 and 49 which are normally closed off by the valves 43 and 44. The carburetor 50 which may be of a conventional type is provided with a flange 51 which mates with a flange 52 on the intake manifold casting 53 and bolts 54 secure the carburetor to the manifold casting. The casting 53 may have a pair of channels 55 and 56 each accommodating a cylinder. Each of the channels communicate with passage 57 into which the passage 58 opens. Passage 58 registers with the outlet passage 59 of carburetor 50. It will be noted that the transfer passage 33 is divided into two compartments 60 and 61 as a result of partition wall 62 which may be formed integrally with engine block 1, thus forming a separate transfer passage for each cylinder, passage 60 serving cylinder 2 and passage 61 serving cylinder 3. The crankcase likewise is divided into separate compartments 63 and 64 by a partition member 67 and when one compartment is under compression the other one is under suction.

When the piston 4 starts on its down stroke, the inlet ports 22 are closed by the skirt of the piston. Compression within the crankcase compartment 63 increases and the fuel mixture which is in compartment 63 and in transfer passage 60 becomes compressed. The pressure in passage 60 is greater than the pressure in compartment 56, thereby valves 43 are closed as viewed in Fig. 2. When the upper end 65 of piston 4 passes the upper edges 66 of inlet ports 22, the fuel mixture in passage 60 and in crankcase compartment 63 rushes through ports 22 into the combustion chamber 26—the greater the compressed condition of the fuel mixture in passage 60 and in crankcase compartment 63 the faster the mixture flows through ports 22, thereby increasing the quantity of fuel mixture present in combustion chamber 26 just prior to ignition. More power can thus be obtained from the engine.

When the piston 4 reaches the end of its down stroke and starts on the up stroke, the compression in the crankcase has been relieved by the fuel mixture flowing through ports 22. Thus, when the piston skirt closes off ports 22 on its up stroke the pressure in crankcase compartment 63 and transfer passage 60 drops below the atmospheric pressure in manifold passage 56 and suction opens valves 43 in the manner indicated by dotted lines in Fig. 2 thereby drawing the fuel mixture from the carburetor through the valve ports 48 into transfer passage 60 and thence into crankcase compartment 63 until such time as the piston again starts on its down stroke.

It can thus be seen that the transfer passage 60 accommodates the incoming fuel mixture on its way to the crankcase and later accommodates the same fuel mixture on its way through inlet ports 22 into combustion chamber 26, thereby eliminating the necessity of separate passage means for admitting the fuel mixture into the crankcase.

Figure 5:
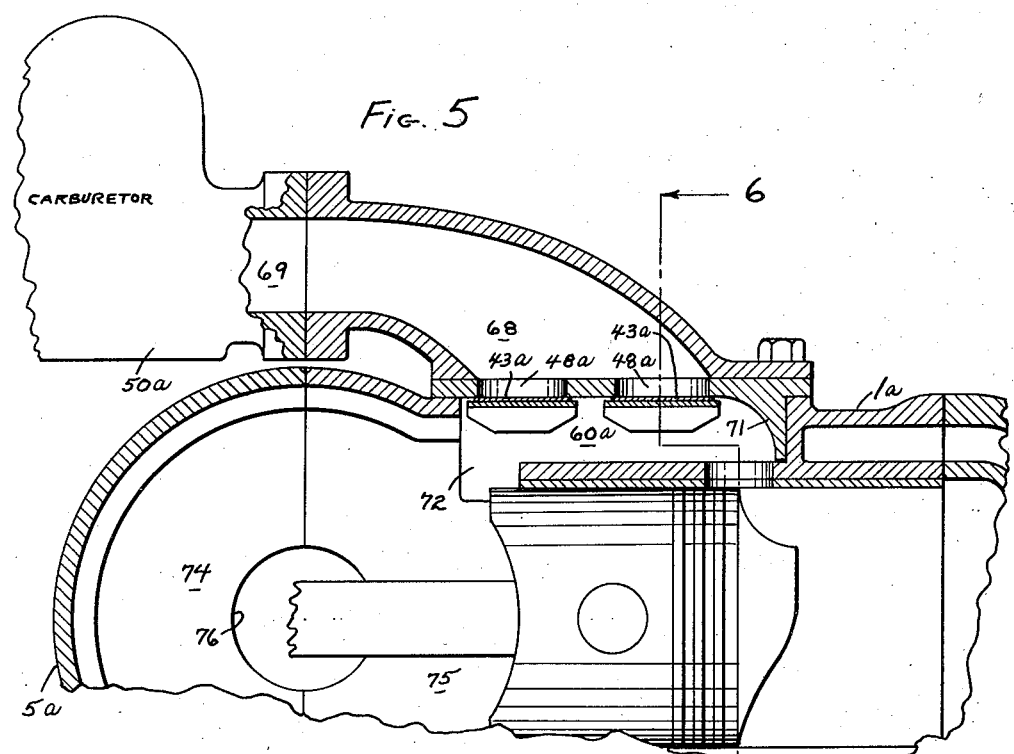
Fig. 5 is a fragmentary sectional view of a modified form of the invention.
Figure 6:
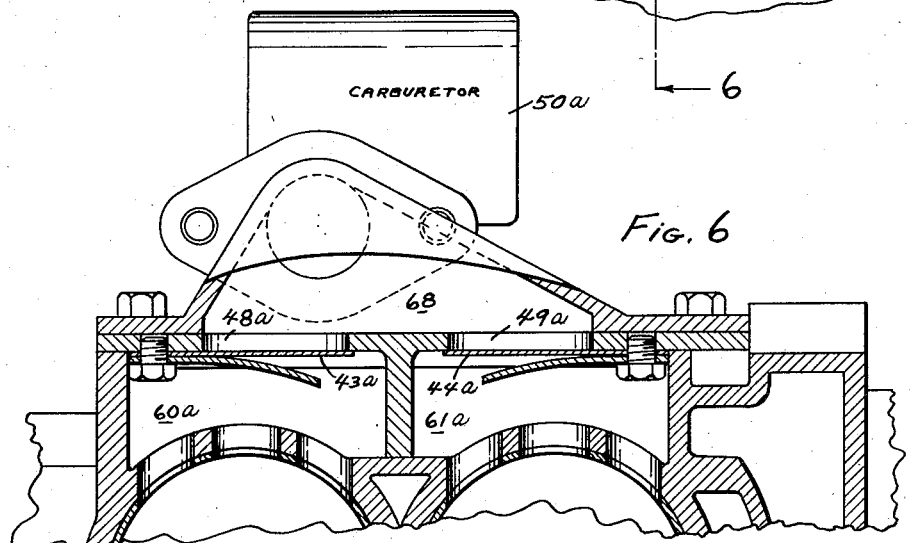
Fig. 6 is a fragmentary sectional view taken on line 6—6 of Fig. 5.
Figure 7:
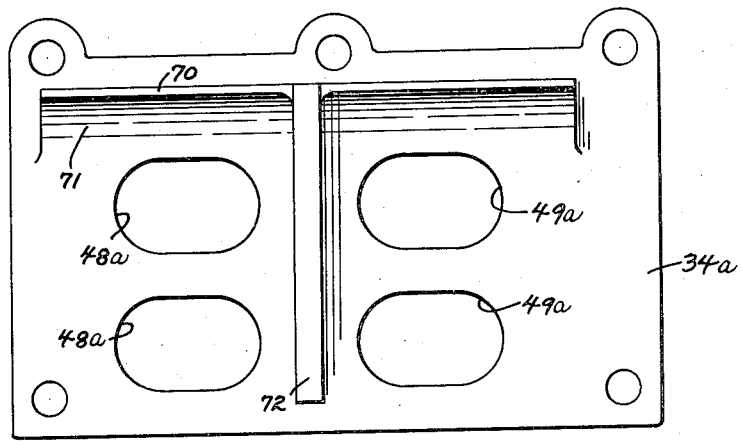
Fig. 7 is a detail view of the valve plate used with the modified form of the invention disclosed in Figs. 5 and 6.

In Figs. 5, 6 and 7 the valve plate 34a is provided with ports 48a and 49a which are normally closed off by the valves 43a and 44a. The intake manifold casting is formed with a single passage 68 which communicates with all of the valve ports 48a and 49a. Said passage 68 registers with the outlet passage 69 of the carburetor 50a. The valve plate 34a has a deflector wall 70 with an arcuate face 71 having a partition wall 72 providing separate transfer passages 60a and 61a.

The valves 43a and 44a are secured to the valve plate 34a and are all directed toward the partition wall 72 as viewed in Fig. 6. The crankcase cover 5a may have an internal web 74 which mates with a web 75 in engine block 1a to form two compartments in the crankcase. A bearing may be mounted in opening 76 through which the crankshaft is journaled.

Figure 8:
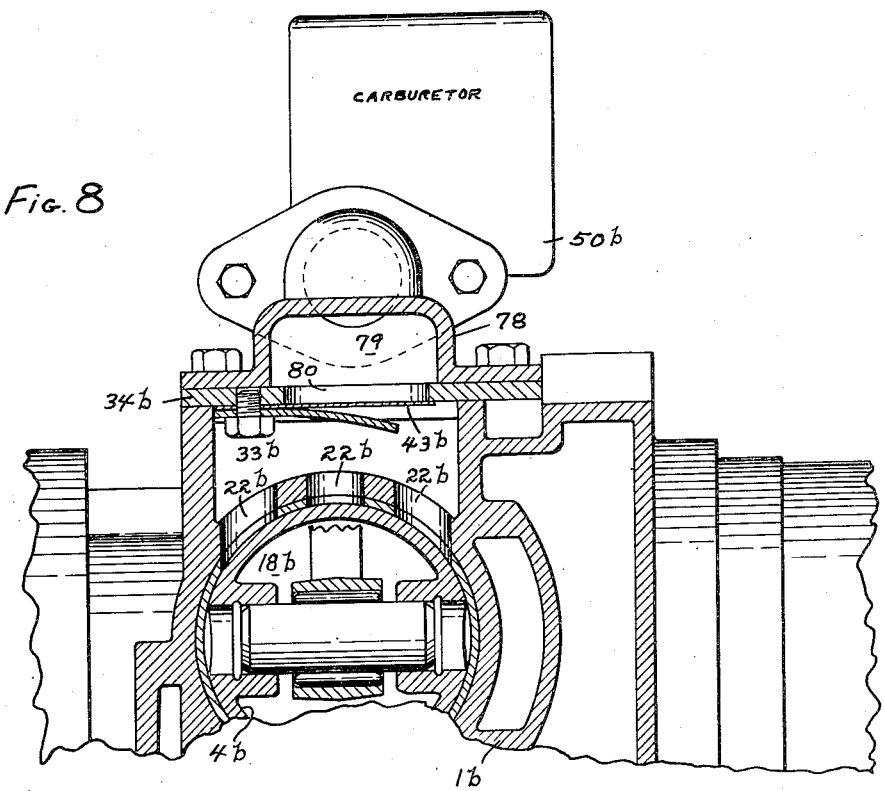
Fig. 8 is a fragmentary sectional view of the invention as it may be employed in a single cylinder engine.

In Fig. 8 the invention is employed with a single cylinder engine in which the engine block 1b has a cavity 33b formed therein and the valves 43b are secured to a valve plate 34b. The valve plate serving to close off the cavity 33b thereby forming an enclosed passage for conducting the fuel mixture to the crankcase 18b when valve 43b is open and serving to conduit the fuel mixture from the crankcase to the combustion chamber through cylinder inlet ports 22b when the piston 4b is on its down stroke. The carburetor 50b is secured to manifold casting 78 and the fuel mixture flows through passage 79 through the valve plate ports 80 when the valves 43b are open.

Having thus described the invention what is claimed is:

1. An internal combustion engine comprising an engine block with cylinders formed therein, a cavity in one face of the engine block and spanning the cylinders, fuel mixture inlet ports establishing communication between the cavity and the combustion end of the cylinders, a crankcase, a passage establishing communication between the interior of the crankcase and the cavity, an intake manifold, a valve plate interposed between the intake manifold and the cavity, reed valves secured to the valve plate for admitting fuel mixture into the cavity and for closing off said fuel mixture alternately with the suction and compression characteristics of the crankcase.

2. An internal combustion engine comprising an engine block having cylinders formed therein, a crankcase, a crankshaft therein, pistons within the cylinders actuated by the crankshaft, a cavity formed in the engine block exteriorly of the cylinders and adjacent thereto, ports in the walls of